United States Patent
Hansen et al.

(10) Patent No.: US 9,536,412 B2
(45) Date of Patent: Jan. 3, 2017

(54) SYSTEM AND METHOD FOR ALERTING AND TRACKING WITH IMPROVED CONFIDENTIALITY

(76) Inventors: Yngvar Hansen, Kristiansand (NO); Inger Ropstad Hansen, legal representative, Kristiansand S (NO); Hans Malterud, Tveit (NO)

(*) Notice: Subject to any disclaimer, the term of this patent is extended or adjusted under 35 U.S.C. 154(b) by 145 days.

(21) Appl. No.: 14/365,387

(22) PCT Filed: Dec. 23, 2011

(86) PCT No.: PCT/NO2011/000355
§ 371 (c)(1),
(2), (4) Date: Oct. 3, 2014

(87) PCT Pub. No.: WO2013/095151
PCT Pub. Date: Jun. 27, 2013

(65) Prior Publication Data
US 2015/0015394 A1    Jan. 15, 2015

(51) Int. Cl.
G08B 21/02 (2006.01)
G08B 21/22 (2006.01)
(Continued)

(52) U.S. Cl.
CPC ........... *G08B 21/0275* (2013.01); *G01S 3/046* (2013.01); *G06F 21/6254* (2013.01);
(Continued)

(58) Field of Classification Search
CPC ....... G08B 29/18; G08B 29/185; G08B 21/22; G08B 21/02
See application file for complete search history.

(56) References Cited

U.S. PATENT DOCUMENTS

| 5,793,882 A * | 8/1998 | Piatek | A62B 99/00 235/462.15 |
| 6,698,653 B1 | 3/2004 | Diamond et al. | |

(Continued)

FOREIGN PATENT DOCUMENTS

| GB | 2 431 495 | 4/2007 |
| JP | 2007-293384 | 11/2007 |

(Continued)

OTHER PUBLICATIONS

International Search Report issued Dec. 26, 2012 in corresponding International Application No. PCT/NO2011/000355.

*Primary Examiner* — Andrew Bee
(74) *Attorney, Agent, or Firm* — Wenderoth, Lind & Ponack, L.L.P.

(57) ABSTRACT

An alarm system comprising at least one first signal source communicating with a central unit configured for providing a logically true alerting signal when predetermined conditions are met. The signal sources may include transponders and a confidential list containing the relation between an RFID chip and the name of the person identified may be stored in a computer. A verification unit is connected to independent signal sources and is configured for providing a logically true verification signal when predetermined conditions are met. The signal sources may also comprise means for measuring bio-functions, and the verification unit may be carried by a safety manager. In such a case, the safety manager will also be able to confirm or reject an alerting alarm from the central unit manually. An alarm signal is activated if and only if the alerting signal is true and the verification signal is true.

20 Claims, 1 Drawing Sheet

(51) Int. Cl.
  *G08B 29/18* (2006.01)
  *G01S 3/04* (2006.01)
  *G08B 13/196* (2006.01)
  *G06F 21/62* (2013.01)

(52) U.S. Cl.
  CPC ....... *G08B 13/19652* (2013.01); *G08B 21/02* (2013.01); *G08B 21/0227* (2013.01); *G08B 21/22* (2013.01); *G08B 29/18* (2013.01); *G08B 29/185* (2013.01); *G06F 2221/2111* (2013.01); *G06F 2221/2153* (2013.01)

(56) References Cited

U.S. PATENT DOCUMENTS

| | | | |
|---|---|---|---|
| 7,113,099 B2 | 9/2006 | Tyroler et al. | |
| 8,284,061 B1* | 10/2012 | Dione | G06Q 30/0269 235/383 |
| 2006/0265195 A1* | 11/2006 | Woodard | G08B 25/08 702/188 |
| 2007/0006322 A1 | 1/2007 | Karimzadeh et al. | |
| 2007/0008138 A1 | 1/2007 | Mosher, Jr. et al. | |
| 2009/0079575 A1* | 3/2009 | Bouressa | G07C 9/00111 340/573.4 |
| 2010/0045461 A1* | 2/2010 | Caler | G08B 25/008 340/541 |
| 2011/0109434 A1 | 5/2011 | Hadsall, Sr. | |
| 2011/0254681 A1* | 10/2011 | Perkinson | G08B 25/14 340/506 |
| 2012/0026008 A1* | 2/2012 | Coleman | G08B 21/0227 340/870.15 |

FOREIGN PATENT DOCUMENTS

| | | |
|---|---|---|
| JP | 2010-56895 | 3/2010 |
| WO | 02/057976 | 7/2002 |
| WO | 2008/027626 | 3/2008 |
| WO | 2011/065910 | 6/2011 |

* cited by examiner

SYSTEM AND METHOD FOR ALERTING AND TRACKING WITH IMPROVED CONFIDENTIALITY

BACKGROUND

The present invention relates to a system and method for alerting and tracking with improved confidentiality.

Several alarm systems including one or more sensors connected to a central unit are known. As a first example can be mentioned smoke and/or burglar detectors connected to a house central unit. Sensors for detecting smoke, movement, doors opened etc. may be connected to the house central unit by a cable or bus or via a wireless connection such as a radio or infrared transceiver, for example. The house central unit, in turn, may communicate with a security or alarm centre when a smoke detector or intrusion sensor is triggered. A second example is various sensors on a plane or ship which communicate with an emergency transmitter. When the sensors indicate a dangerous situation, a rescue or alarm centre may be notified automatically by means of the emergency transmitter.

A problem with such automatic alarm systems is the occurrence of "false" alarms caused by technical failures or triggered unintentionally. For example, the presence of dust may cause some smoke detectors to give off a signal, or a person having legitimate access to some premises may forget to deactivate an alarm system and thereby unintentionally activate an alarm. In the case of alarm systems which automatically call a monitoring centre, such a false alarm may lead to an unnecessary emergency turn-out. In the worst-case scenario, a false alarm could result in that rescue equipment is not readily available when a real danger situation arises.

Tracking systems are also known in which the users are provided with machine readable badges, such as cards used in entering and leaving a building, for example. Such systems may be useful when an alarm is triggered, e.g. in that they may be used by authorized persons to check that an office building has been evacuated or alternatively to identify any persons still located in the building. Similar systems could be used in boat or airplane traffic in that passengers and crew are provided with RFID chips, another type of transponder, or other suitable equipment. Due to privacy concerns, lists associating a chip/location with the identity of a person should only be made available for authorized personnel.

From US 2007/0008138 A1, a person and luggage monitoring system and method using RFID technology are known. According to this method and system, a person and his/her luggage are associated with each other by way of RFID chips. GB 2 431 495 A discloses a system for monitoring personnel on the bridge of a ship of which the objective is to reveal if personnel on watch are unavailable.

In principle, any ferry and passenger ship travel always involves a risk that passengers and crew may end up as missing after a shipwreck. In such cases, it is important to be able to track missing persons. At the same time, it is important to ensure privacy and confidentiality. An embodiment of the system described in the following may be introduced as a routine safety measure, for example, in sea passenger transport and similarly in other situations in which there is empirically a certain risk that a search for missing persons must be initiated in the case of an accident or the like. In such a case, the system needs to be reliable and make sure that only authorized personnel are able to access to certain information.

Hence, a need exists for an alarm system with a reduced risk of false alarms and greater reliability. There also exists a need for a system which ensures privacy and confidentiality issues in a better manner than do the current systems.

Thus, an object of the present invention is to provide an alarm system with improved integrity and confidentiality.

SUMMARY OF THE INVENTION

This object in achieved according to the invention by an alerting system comprising at least one first sensor communicating with a central unit configured for providing a logically true alerting signal when predetermined conditions are met, characterized by a verification unit configured for providing a logically true verification signal when predetermined conditions are met, and a transmitter which is activated if and only if the alerting signal is true and the verification signal is true.

In another aspect, the invention relates to an alerting method comprising the steps of identifying a threat, triggering a first alerting signal, verifying the threat by independent means, and triggering an alarm if and only if the alerting signal is true and the threat is verified.

In one embodiment, the system comprises unique identity tags carried close to the body of the user, and wherein lists associating the identity tag with a person are stored confidentially. A separate list containing only activated identity tags can be made available on the rescue site to facilitate the work of updating missing person lists with a reduced risk that names of missing persons or other personal names are revealed to persons not concerned.

Further features and advantages of the invention will be apparent from the accompanying independent patent claims. Particular embodiments of the present invention appear from the dependent patent claims.

BRIEF DESCRIPTION OF THE DRAWINGS

The invention will now be described in more detail with reference to the attached drawings, in which.

DETAILED DESCRIPTION

Figure 1:
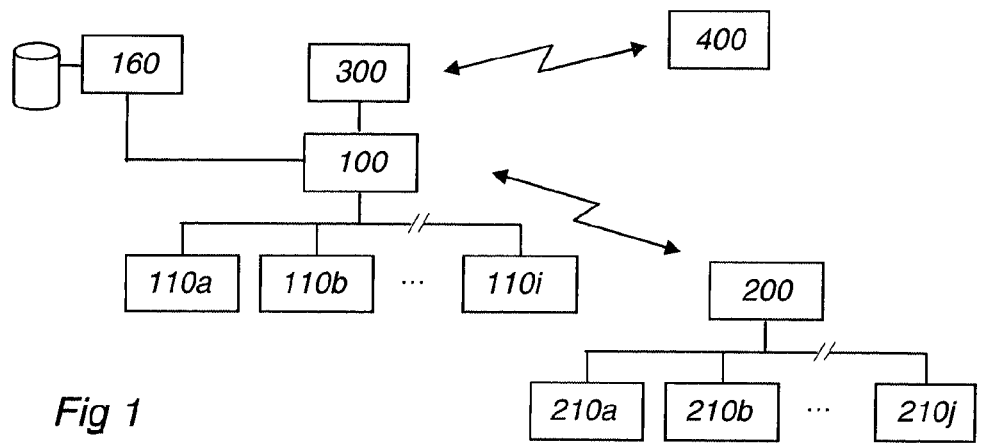
FIG. 1 is a principle drawing of a system according to the invention.

FIG. 1 is a schematic depiction of a first embodiment of the invention. This embodiment is described by way of an exemplary application on a ship and a sea rescue operation. Other embodiments adapted for use in other contexts are detailed below.

A central unit 100 is located on the bridge of a ship. The central unit 100 is logically connected to a plurality of signal sources 110a-i. In this example, for simplicity, signal sources 110 are transponders, smoke detectors, and manual fire alarms. However, it must be understood that the term "signal source" includes any type of sensor, including biometrical sensors, as well as manual means able to produce a signal, such as a fire alarm, service alarm etc. In the present example, each person on the ship is provided with a transponder 110i, 210j. A transponder operates by returning a code when it is hit by a signal. Transponders suitable in this example are transponders using energy of an incoming radio signal to return an identity (ID), such as RFID chips of the type used for tagging pets, luggage on airports, or in road toll chips, for example.

Central unit 100 is also logically connected to a verification unit 200. In the present example, verification unit 200 is carried by a duty officer or safety manager. Verification unit 200 is connected to associated signal sources 210a-j. It is important that signal sources 210 are independent of signal sources 110, but the logical connections between signal sources 210 and verification unit 200 may be wireless or cabled connections, like the corresponding connections between signal sources 110 and central unit 100.

One purpose of the verification unit 200 is to alert if a safety manager becomes unavailable and/or dies. To this end, verification unit 200 may be a small unit carried by the safety manager or duty officer, for example, and communicating with signal sources 210 in the form of a transponder, a GPS device, and one or more biometric sensors for indicating whether or not the carrier is alive. If the level of a bio-function monitored departs significantly from the normal level, an alarm signal is triggered and transmitted to the central unit 100 locally on the ship. The biometric sensor should be able to resist a stay in seawater, and, for this purpose, may be a heart rate sensor of the type strapped around the wrist or chest of the user, for example. Another type of biometric sensor which may suitable monitors eye movements. It must be understood that any prior art sensor may be used as a signal source 110 or 210, and that the above sensors are only exemplary sensors in a simplified example.

Verification unit 200 may additionally include a radio transmitter for communicating with central unit 100, e.g. in order to transfer heart rate, respiration rate, or other vital signs, location from the GPS device and other sensor data, as well as data for disrupting an alarm or triggering an alarm. Unit 200 may also be used for authorizing a disrupted alarm, e.g. in that an alarm can only be disrupted when transmitted together with a code or ID embedded in verification unit 200. In this case, due to the auxiliary functions provided, verification unit 200 includes its own power supply, such as a battery, as opposed to an RFID chip using the energy of an incoming RF signal to return its ID.

Central unit 100 is also connected to a transmitter 300 for external communication. In this example, transmitter 300 may be a conventional radio transmitter and receiver providing communication between the ship and a transceiver 400 at a land based rescue centre.

A passenger list containing relations between a passenger and the chip ID of the passenger may be created and stored in central unit 100 or in an external computer 160.

A method of using the system of this first example is that all passengers and crew members on the ship are provided with an RFID chip before entering the ship. Each person carries this chip for as long as he or she stays on board, e.g. by carrying the chip in a bracelet or around the neck. A list of which chip is carried by which person is created and stored confidentially.

In the case of a shipwreck, fire, or another dangerous situation, initially an alerting alarm at a central unit 100 is triggered. The alerting alarm may be triggered by one or more sensors, such as manual alarm activators, smoke detectors, and so on, and registered at central unit 100. The alerting alarm must be verified before a full alarm, in this example an emergency call to an external receiver 400, is transmitted by means of a transmitter 300. Verification may be accomplished in that a safety manager confirms the alarm manually by means of verification unit 200, in that verification unit 200 doesn't receive heart rate or other biometric data from the carrier, and/or in that the safety manager does not actively disrupt the alerting alarm within a certain time period, such as within 3 minutes, for example. Such a time period (if used) is preferably chosen so that the safety manager is given a reasonable opportunity to confirm or reject the situation before the external full alarm is triggered or disrupted, including situations which can be handled without any external help, such as a small fire, for example.

Requiring that at least two events must occur before an external alarm is triggered increases the integrity or reliability of the system. In the present example, a fire alarm triggered by accident will only result in an alerting alarm at central unit 100, and will not be forwarded to the external receiver 400 until it has been verified. Similarly, a temporary loss of biometric data such as heart rate, respiration rate, or eye movements, for example, from the safety manager will not result in a full or external alarm unless an alerting alarm is triggered at the same time.

In the case of a full alarm, in this example, an emergency call is transmitted to a receiver 400 at a land based rescue centre, which then sends rescuers to the ship. The rescuers are provided with a list of codes from signal sources 110, i.e. the RFID chips in this example. The rescuers don't need to know the names of the passengers and crew, but are still able to quickly report which RFID chips have been found. This improves the protection of personal information and reduces the risk that the responsible authorities will be unable to notify the next of kin before the press or other unconcerned parties contact the next of kin or publish the names of any missing persons.

Like the safety manager on board, which in the above example carries a GPS device in addition to the transponder, passengers could also be provided with a positioning device. Such a device may facilitate the work during a rescue operation, but will of course also increase the cost of investment and operation, such as battery maintenance.

It must be understood that one or more of the devices described can be combined.

For example, in one embodiment, central unit 100 and verification unit 200 can be combined into one apparatus. This may be advantageous, for example, if central unit 100 is used in a building monitoring system. In this example, a first signal source 110 is a boundary protection sensor, such as a sensor detecting a broken window or a sensor detecting that a door is forced open, for example. A second, independent sensor detects movements in an inside room and is connected to a "verification unit" 200. In this example, the combined central unit 100 and verification unit 200 may be a logical circuit activating an audio transmitter 300, such as an alarm bell, if and only if a boundary intrusion is verified by a movement inside, and vice versa. Thereby it is avoided that a family member which unlocks and enter a house (no boundary intrusion) triggers an alarm even though the family member is detected by the movement sensor, or that the alarm is triggered by the family dog, in this case too because no boundary intrusion has been made. In the opposite case, the breaking of a window during ball play in the garden will normally not trigger an alarm because it is not followed by a significant movement. This example shows that a principle of the invention is that two independent units verify each other, and that they may be integrated into one functional unit. Of course, such a system may additionally include a delay allowing a person to unlock and enter the monitored building and then deactivate the system before the alarm is triggered, as well as other functions common in intrusion alarms for permanent installation in a building.

Similarly, central unit 100 and verification unit 200 may be integrated into a mobile unit for field use.

Further, signal source 110 may be integrated with central unit 100 into one unit, or may be separate units so that the sensors and central unit are able to communicate wirelessly, by way of mobile telephony or other radio signals, for example.

Figure 2:
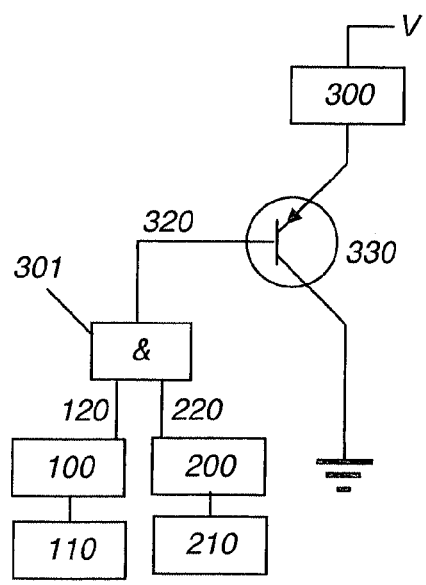
FIG. 2 illustrates the logical structure of the system.

FIG. 2 schematically shows a logical circuit for use with the invention, in which central unit 100 triggers an alerting signal 120 depending on input from at least one signal source 110. Signal source 110 may be any sensor or other means as described above, and alerting signal 120 is set logically high if at least one signal source 110, e.g. a smoke detector or fire alarm, is triggered. Alerting signal 120 appears in FIG. 2 as an input to a logical AND gate 301, which only outputs a high signal if alerting signal 120 AND a verification signal 220 (as described below) is true. It must be understood that output signal 120 may, in some cases, be a logically high voltage level, or, in other cases, be a radio signal having the same function, in which a receiver sets a logically high signal.

A similar verification unit 200 is connected to signal sources 210 being independent of signal sources 110. Verification unit 200 produces a verification signal 220, which, like output signal 120, may be a logically high voltage level or, in other cases, a radio signal having same function, in which a receiver sets a logically high signal. The verification signal is connected to the second input of AND gate 301. Hence, alarm signal 320 from AND gate 301 is set logically high if and only if both alerting signal 120 AND verification signal 220 is logically high.

As seen in FIG. 2, output 320 from the AND gate may, for example, be connected to the base of a transistor 330, with the power supply to a transmitter 300 being connected in series with the collector and emitter of transistor 330 between an appropriate voltage level V and ground, so that the transistor starts to conduct current when the base is set logically high. In this manner, current will only flow to transmitter 300, and transmitter 300 is consequently only able to transmit if and only if both input signals 120 and 220 of the logical AND gate 301 indicates "TRUE".

When transmitter 300 is activated, it may automatically transmit a verified call to an external receiver 400 (FIG. 1), located, for example, at the fire department in the case of fire, at a private security centre in the case of burglary, or at a public rescue central in the case of a shipwreck or another marine emergency.

It is also possible to distribute the functional blocks differently than as described herein. For example, receiver 400 may receive radio signals from both a central unit 100 as well as a verification unit 200 and include an AND function, instead of having the AND function connected to transmitter 300 as described above.

Reference is now made back to the first example with the embodiment on board a ship. When an alarm 320 is triggered, a call signal may be broadcast that "wakes up" the transmitters of tracking units 110, 210 with which contact is made, and said units may transmit a response signal which is registered at central unit 100. In this manner the database is updated so that a list is available of how many and which tracking units could be contacted, and hence how many tracking units which did not respond when the alarm 320 was triggered.

Subsequently, central unit 100 periodically broadcasts new call signals so that the database is updated, e.g. that contact is made with an increasingly lower number of tracking units as additional tracking units/persons can be accounted for.

When receiver 400 receives the emergency signal from transmitter 300, it will include information on which ship is involved as well as the position of the ship. Before a rescue operation is initiated, it will be advantageous if the rescue central, by means of radio 400, tries to establish contact with the ship in order to verify that a dangerous situation really exists and obtain any details on the situation.

The invention claimed is:

1. An alerting and tracking system comprising:
   a central unit;
   a plurality of first signal sources;
   a verification unit;
   a second group of associated signal sources;
   a logical AND gate;
   a first list of identity tags provided by the plurality of first signal sources for unauthorized personnel;
   a second list associating the identity tags with personal information; and
   a transmitter, wherein
   the central unit is logically connected to the plurality of first signal sources, the verification unit, and the transmitter, and provides a logical true alerting signal if at least one of the plurality of first signal sources is logically high,
   the verification unit is connected to the second group of associated signal sources, and produces a verification signal,
   the logical AND gate provides an alarm signal if the logical true alerting signal is true and the verification signal is true,
   the central unit communicates with at least one identity tag of the identity tags in the first list of identity tags provided by the plurality of first signal sources, the at least one identity tag associated with an individual, and
   the second list associating the identity tags with personal information is available only to authorized personnel.

2. The system of claim 1,
   wherein the verification unit communicates with the second group of associated signal sources independently of the plurality of first signal sources.

3. The system of claim 1,
   wherein the verification unit transmits the verification signal on manual activation.

4. The system of claim 1,
   wherein the verification unit is carried by a safety manager and communicates with a sensor configured for indicating if the safety manager becomes unavailable.

5. The system of claim 4,
   wherein the sensor is a biometric sensor configured for indicating the heart rate, respiration, and/or eye movements of the safety manager.

6. The system of claim 1,
   wherein the verification unit comprises a GPS device.

7. The system of claim 1,
   wherein the verification unit includes a code for authorizing the disruption of an alarm.

8. An alerting and tracking method, comprising the steps of:
   providing risk exposed individuals with identity tags,
   registering which identity tag belongs to which individual and storing information on which identity tag belongs to which individual confidentially,
   when a threat is identified,
   triggering a first alerting signal,
   verifying the threat by way of producing a verification signal from a verification unit being connected to a second group of associated signal sources,
   triggering an alarm if and only if the first alerting signal is true and the threat is verified, and obtaining a first list of identity tags for personnel who are not authorized to get the information on which identity tag belongs to which individual.

9. The method of claim 8,
wherein the step of triggering an alarm comprises transferring a second list associating unique identity tags with individuals.

10. The system of claim 2,
wherein the verification unit is carried by a safety manager and communicates with a sensor configured for indicating if the safety manager becomes unavailable.

11. The system of claim 3,
wherein the verification unit is carried by a safety manager and communicates with a sensor configured for indicating if the safety manager becomes unavailable.

12. The system of claim 10,
wherein the sensor is a biometric sensor configured for indicating the heart rate, respiration, and/or eye movements of the safety manager.

13. The system of claim 11,
wherein the sensor is a biometric sensor configured for indicating the heart rate, respiration, and/or eye movements of the safety manager.

14. The system of claim 2,
wherein the verification unit comprises a GPS device.

15. The system of claim 3,
wherein the verification unit comprises a GPS device.

16. The system of claim 4,
wherein the verification unit comprises a GPS device.

17. The system of claim 10,
wherein the verification unit comprises a GPS device.

18. The system of claim 11,
wherein the verification unit comprises a GPS device.

19. The system of claim 5,
wherein the verification unit comprises a GPS device.

20. The system of claim 12,
wherein the verification unit comprises a GPS device.

* * * * *